Figure 1:
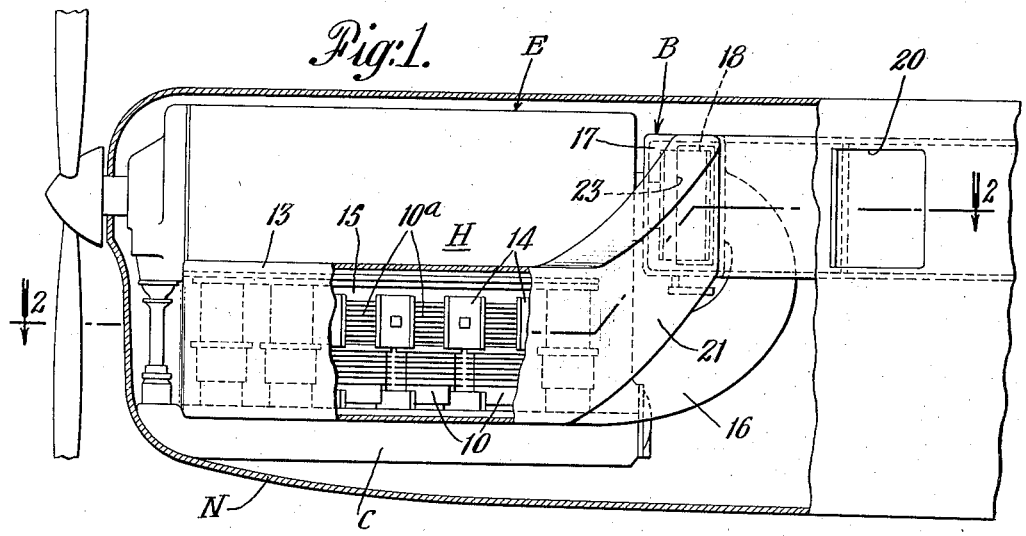

Jan. 29, 1946.  A. T. GREGORY  2,393,899

ENGINE COOLING SYSTEM

Filed Nov. 2, 1942

INVENTOR
ALFRED T. GREGORY
BY
ATTORNEYS

Patented Jan. 29, 1946

2,393,899

UNITED STATES PATENT OFFICE 2,393,899

ENGINE COOLING SYSTEM

Alfred T. Gregory, Massapequa, N. Y., assignor to Fairchild Engine and Airplane Corporation, Farmingdale, N. Y., a corporation of Maryland Application November 2, 1942, Serial No. 464,218

3 Claims. (Cl. 123—171)

This invention relates to improvements in cooling systems for internal combustion engines, and relates particularly to cooling systems for air-cooled aeronautical engines of the V, X, H, or other in-line types.

Heretofore the cooling systems for such air-cooled airplane engines have included a scoop along one side of the cylinder bank into which air is forced by the movement of the airplane and the slipstream of the propeller. Plates or baffles substantially closing the intercylinder spaces form with the scoop a closed chamber in which the incoming air builds up a considerable static pressure and from which it is led in intimate contact with the cylinders to cool the same, the gross area of the outlets from the scoop being less than the area of the scoop intake opening. The baffles are so shaped on the lee side of the cylinders that a Venturi effect is created which increases the velocity of the spent air and tends to urge it away from the cylinders. The hot spent cooling air is then withdrawn through passages or gills by the aspirating action of the air stream flowing over the fuselage and the wings.

The flow of air over the cylinders is caused primarily by a difference in the air pressures in the scoop and in the passages for withdrawing the heated air. Although aided by the aforementioned Venturi and aspirating effect, this pressure differential under some operating conditions actually is relatively small, first, for the reason that it is not possible under all operating conditions to build up a high pressure in the scoop by means of movement of the plane and/or the slip-stream of the propeller and, second, for the reason that the aspirating action of the air stream can create, at best, but slight subatmospheric pressures on the lee side of the cylinders opposite the scoop. Moreover, the pressure differential is materially decreased for the reason that the air heated by passage over the cylinders expands considerably and thereby tends to increase the pressure in the outlet or aspirating passages. For these reasons, the spent cooling air often is not removed from the cowling as rapidly as is desired.

Under normal operating conditions, systems of the type described above operate satisfactorily, but under abnormal conditions, such as high power operation of the engine, for example, on the ground or during take off and climb where the air speed of the airplane may be considerably less than in level flight, or at high altitudes where the density of the cooling air and thus its cooling capacity is very low there is a tendency for the engine to become overheated.

In accordance with the present invention, I have provided a system for cooling air-cooled engines, particularly of the "in-line," X, H, or V type, which augments the Venturi and aspirating actions in removing the spent cooling air from the cowling and thus assures the cooling of the engine under all conditions of operation.

More particularly, I have provided a system including the usual scoop and baffle combination for delivering cooling air under pressure to the cylinders of an aeronautical engine of the air-cooled type, in which the means for withdrawing the heated air is augmented by a blower mechanism to cause a large volume of cooling air to flow over the cylinders of the engine.

As indicated above, the aspirating means alone, under some conditions, for example, at high power operation of the engine, cannot maintain such a rapid flow of air that efficient cooling is obtained. In my system, the suction fan or blower makes up for this deficiency of the aspirating system and compensates for expansion of the heated air so that the necessary pressure drop is maintained between the airscoop and the aspirating passageways. Under these conditions, a rapid flow of air is maintained at all times.

Figure 2:
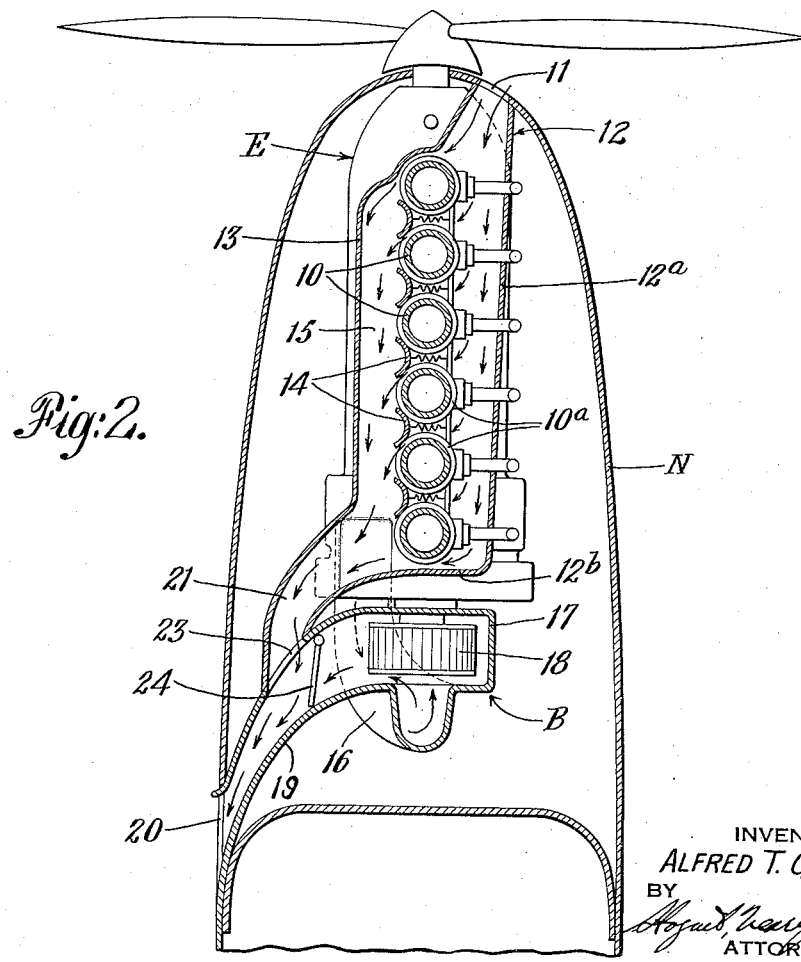

For a better understanding of the present invention, reference may be had to the accompanying drawing, in which:

Figure 1 is a view in side elevation of a typical form of cooling system for an in-line type of engine with part of the cowling broken away to disclose details thereof; and Fig. 2 is a view in section taken on line 2—2 of Fig. 1.

As illustrated in Figs. 1 and 2, the present invention is disclosed as applied to an in-line type of engine E having six cylinders 10 suitably provided with cooling fins 10a to aid in the dissipation of heat therefrom. It will be understood that the cooling system embodying the present invention may be applied equally well to V, X, H, pancake and other in-line types of engines so the form of invention disclosed herein should be considered as illustrative.

As shown particularly in Fig. 2, the cowling N of the airplane is streamlined and forms a housing enclosing the engine. An aperture 11 is provided at the front end of the cowling N forming the inlet of an airscoop 12 for supplying air to the cylinders 10. The airscoop 12 includes a sheet metal partition member 12a having a flange 12b at the rear end thereof extending into close engagement with the cooling fins of the last cylinder 10 in the bank. The partition member 12a extends from the valve and camshaft housing H to adjacent the crankcase C of the motor E so as to confine the air flow around the cylinders. A second partition member 13 is mounted adjacent the edge of the aperture 11 opposite to the member 12a. The member 13 extends inwardly toward the first cylinder 10 of the bank into engagement with the edges of the cooling fins of the first cylinder.

Additional baffle plates 14 are interposed between and overlie the cylinders in order to form restricted passageways through which air must flow in contact with the walls and radiating fins of the cylinder. The baffle plates and the airscoop are disclosed more particularly in the W. F. Davis Reissue Patent No. 20,251, dated January 26, 1937.

The air, after flowing around and between the cylinders 10, passes into a chamber 15 on the lee side of the cylinders so that the heated, spent cooling air is isolated therein. This chamber 15 has a rearwardly extending duct 16 that communicates with the rear side of the housing 17 of a blower B having an impeller 18 therein that is driven by the engine E or in any other suitable way, in order to withdraw heated air from the chamber 15. The air is forced from the blower B through a laterally directed, rearwardly curved conduit 19 that communicates with the atmosphere through a gill slit or louvre 20. The air flowing along the sides of the cowling N will aid in withdrawing the heated air from within the chamber 15.

During substantially full throttle operation, the blower B may be used to cool the engine E. However, under certain operating conditions, for example, during level flight cruising, the blower may cool the engine excessively.

In order to cool the engine properly under both conditions, I provide means for venting the chamber 15 directly to atmosphere and for rendering the blower B ineffective. This means includes a conduit 21 at the rear end of the chamber 15 that communicates with the conduit 19 through a valve port 23. The port 23 can be opened or closed by means of a pivoted valve 24 that is movable between positions completely uncovering the port 23 and closing the conduit 19 between the port 23 and the blower housing 17, and completely closing the port 23 and opening the conduit 19. With this arrangement, the flow of air over and the temperature of the cylinders 10 can be closely regulated to maintain them at optimum operating temperature. The valve 24 can be operated in any suitable way, for example, by thermostatically or manually operated controls.

When the motor E is being warmed up prior to takeoff, the port 23 is closed, preferably, with the result that the blower B is rendered effective to draw air over the cylinders. Inasmuch as the plane is not moving, the flow of air over the cylinders will permit the engine to warm up gradually but will protect the engine against overheating and thereby extend the period of ground operation of the engine.

During the take-off, the port 23 may remain closed to render the blower 18 operative so that the engine will not become overheated at substantially full throttle operation. After the airplane has levelled off and the engine retarded to cruising speed, the port 23 may be opened if the blower B has a tendency to cool the engine below normal operating temperatures. The blower B may be used to cool the engine when it is necessary to operate the engine substantially at full throttle over any considerable period of time, or if the engine shows a tendency to heat up because of a change of altitude or the like.

It will be understood that the shape and size of the air duct and of the blower may be varied considerably and that one or more scoops may be used, depending upon the type of engine being cooled. For example, a V-type engine preferably will have the scoop disposed between the banks of cylinders, with the baffles for directing the air around the cylinders and the chambers 15 on the exterior of the banks. Moreover, the entire cowling N may be used as a scoop, if desired, thereby circulating cooling air around the entire engine and cooling all parts thereof. Therefore, the form of device disclosed herein should be regarded as illustrative only and not as limiting the scope of the following claims.

I claim:

1. In a system for delivering air through a casing mounted within a cowling and enclosing one side of the cylinders of an internal combustion engine; the combination of a blower adjacent the rear of said casing having a housing and an impeller therein driven by said engine, said housing having a centrally located port in its rear side and a peripheral port, a first conduit connecting said casing to said centrally located port, a second conduit connecting said peripheral port to the atmosphere exterior of said cowling and extending laterally from said housing, a third conduit connecting said casing and said second conduit, and valve means for selectively connecting said third conduit to and disconnecting it from said second conduit and closing and opening said second conduit between said blower and said third conduit.

2. In a cooling system for delivering air through a casing mounted within a cowling and enclosing one side of the cylinders of an internal combustion engine; the combination of a first conduit behind said engine having an inlet communicating with the interior of said casing and the exterior of said cowling, an impeller driven by said engine in said conduit, a second conduit communicating with said casing and communicating with said first conduit through a port in said first conduit between said impeller and the outer end of said first conduit, and valve means cooperating with said port and said first conduit to permit said port to be opened and said conduit to be substantially closed between said blower and said port, and to close said port and open said conduit.

3. In a system for delivering air through a casing disposed within a cowling and enclosing one side of the cylinders of an inline internal combustion engine; the combination of a blower having a housing and an impeller, means extending through one side of said housing for connecting said impeller to said engine, said housing having a centrally located intake port in a side opposite to said one side and a peripheral discharge port, a first conduit connecting the interior of said casing to said intake port, a second conduit connected to the interior of said housing through said discharge port and extending laterally to the exterior of said cowling, a third conduit connecting the interior of said casing to said second conduit intermediate the ends of the latter, and valve means movable selectively to one position preventing communication between said second and third conduits and to another position closing said second conduit between said discharge port and the point of connection of said third conduit to said second conduit.

ALFRED T. GREGORY.